United States Patent
Meunier

(10) Patent No.: US 11,300,028 B2
(45) Date of Patent: Apr. 12, 2022

(54) AFTER TREATMENT EXHAUST GAS MIXER

(71) Applicant: FAURECIA SYSTEMES D'ECHAPPEMENT, Nanterre (FR)

(72) Inventor: Stéphanie Meunier, Beaucourt (FR)

(73) Assignee: FAURECIA SYSTEMES D'ECHAPPEMENT

( * ) Notice: Subject to any disclaimer, the term of this patent is extended or adjusted under 35 U.S.C. 154(b) by 0 days.

(21) Appl. No.: 17/124,611

(22) Filed: Dec. 17, 2020

(65) Prior Publication Data
US 2021/0189939 A1    Jun. 24, 2021

(30) Foreign Application Priority Data
Dec. 23, 2019    (FR) ...................................... 19 15475

(51) Int. Cl.
*F01N 3/28* (2006.01)
(52) U.S. Cl.
CPC ............ *F01N 3/28* (2013.01); *F01N 2610/00* (2013.01)
(58) Field of Classification Search
CPC ............ F01N 2240/20; F01N 2470/14; F01N 2470/22; F01N 2610/00; F01N 3/2066; F01N 3/2892
See application file for complete search history.

(56) References Cited

U.S. PATENT DOCUMENTS 10,024,217 B1 *   7/2018   Johnson ................ F01N 13/143

FOREIGN PATENT DOCUMENTS

| DE | 202015102092 U1 | 8/2015 |
| DE | 102015106876 A1 | 11/2015 |
| EP | 3470640 A2 | 4/2019 |

OTHER PUBLICATIONS

Preliminary Research Report for French Application No. 1915474 dated May 20, 2020.

* cited by examiner

*Primary Examiner* — Anthony Ayala Delgado
(74) *Attorney, Agent, or Firm* — Carlson, Gaskey & Olds, P.C.

(57) ABSTRACT

An after-treatment exhaust gas mixer for mixing the exhaust gas with a reducing agent, such as a diesel exhaust fluid for selective catalyst reduction, comprises a mixing chamber through which the exhaust gas circulates, from an inlet to an outlet, and a reducing agent sprayer, able to spray a reducing agent into the mixing chamber. The mixing chamber comprises a pipe that is rectilinear along an axis and the sprayer is positioned in the upstream part of the rectilinear pipe and oriented so as to spray in the downstream direction substantially parallel to the axis.

11 Claims, 1 Drawing Sheet

AFTER TREATMENT EXHAUST GAS MIXER

CROSS-REFERENCE TO RELATED APPLICATIONS

This application is a U.S. non-provisional application claiming the benefit of French Application No. 19 15475, filed on Dec. 23, 2019, which is incorporated herein by reference in its entirety.

TECHNICAL FIELD

The disclosure relates to the field of exhaust lines positioned downstream of an internal combustion engine, and more particularly an after-treatment mixer.

BACKGROUND

It is known, in order to neutralize the pollutants, and more particularly the nitrogen oxides, NOx, present in an internal combustion engine exhaust gas, to use a mixer upstream of a catalyst. A mixer is a device in which the exhaust gas circulates from an inlet to an outlet. During this circulation, the mixer adds a reducing agent to the exhaust gas. This reducing agent or reducing fluid for selective catalyst reduction (SCR) is also called DEF (Diesel Exhaust Fluid), or referred to using the commercial name AdBlue. It may be an aqueous solution of urea or a gaseous solution of ammonia. The exhaust gas mixture doped with reducing agent is next oriented toward a catalyst, which can effectively reduce the mixture.

In order for the reduction in the catalyst to unfold correctly, the mixer should produce as homogeneous a mixture as possible, with a constant proportion. The weight ratio of reducing fluid to the weight ratio of exhaust gas should therefore be adapted. The problem that many existing mixers encounter is that the increase in the weight ratio of reducing fluid is accompanied by an increase in the spraying power, which causes a risk of the reducing fluid being deposited on a wall of the mixer. Such a deposit is detrimental in that it delays mixing, in addition to the risk of dirtying the mixer, and thus alters the proportion of the mixture over time.

SUMMARY

A mixer according to the disclosure proposes to position a pipe long enough that the spraying of the reducing fluid, even at the strongest mass flows, cannot reach a wall of the mixer.

To that end, the disclosure relates to an after-treatment exhaust gas mixer for mixing the exhaust gas with a reducing agent, such as a diesel exhaust fluid for selective catalyst reduction, comprising a mixing chamber through which the exhaust gas circulates, from an inlet to an outlet, and a reducing agent sprayer, able to spray the reducing agent into the mixing chamber. The mixing chamber comprises a pipe that is rectilinear along an axis and the sprayer is positioned in the upstream part of the rectilinear pipe and oriented so as to spray in the downstream direction substantially parallel to the axis.

Specific features or embodiments, which may be used alone or in combination, are:
- the mixer configured to be positioned upstream of at least one monolith, preferably at least two, substantially cylindrical, positioned perpendicularly to the axis and the length of the rectilinear pipe is inclusively between the diameter of a monolith and the sum of the diameters of said at least one monolith increased by 50%,
- the mixer further comprises a substantially U-shaped deflector, the inlet being positioned outside one of the branches of the "U" and the outlet being positioned at the bottom of the "U", so as to form a three-part circulation of gas: a first part running alongside a first branch of the "U" by the outside and connecting the inlet with the base of the "U", a second part, forming the rectilinear pipe, running alongside a second branch of the "U" by the outside and connecting the base of the "U" with the end of the second branch of the "U" and a third part running alongside the branches of the "U" by the inside and connecting the end of the second branch of the "U" with the outlet,
- the deflector further comprises a third branch, connected to the end of the first branch and running alongside the rectilinear pipe to the sprayer,
- the deflector also comprises an upper cover connecting all of its branches,
- the mixing chamber is configured as a box, comprising two substantially planar faces that are substantially parallel to one another, and a peripheral flank having a closed contour and extending from one face to the other, the deflector connecting the two faces and having its first branch extended to the inside of the flank,
- the inlet is positioned in the peripheral flank or in one of the faces,
- the outlet is positioned in one of the faces,
- the inlet and the outlet are positioned in a same face.

In a second aspect of the disclosure, an exhaust line comprising such a mixer is provided.

In a third aspect of the disclosure, a vehicle comprising such an exhaust line is provided.

BRIEF DESCRIPTION OF THE DRAWINGS

The disclosure will be better understood upon reading the following description, provided solely as an example, and in reference to the appended figures, in which.

DETAILED DESCRIPTION

Figure 1:
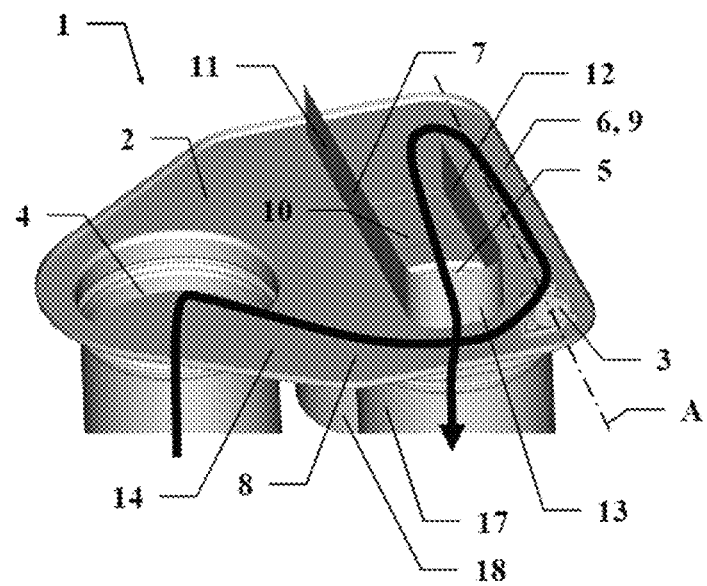
FIG. 1 shows one embodiment, cover removed, in perspective view.

In reference to FIG. 1, a mixer 1 is shown with its cover 15, 16 removed. The circulation of the exhaust gas is shown by a thick arrow. The exhaust gas enters through the inlet 4, with a circulation, in the plane of the figure, from bottom to top. The inlet 4, which here is cylindrical, opens into the mixing chamber 2. The exhaust gas circulates through the mixing chamber 2 until reaching the outlet 5, with a circulation, in the plane of the figure, from top to bottom. The mixer 1, with the exception of its inlet 4 and its outlet 5, is completely gas-tight. In order to mix the exhaust gas with the reducing agent, such as a diesel exhaust fluid for selective catalyst reduction, the mixer 1 also comprises a reducing agent sprayer 3. This sprayer 3 is able to spray the reducing agent in the mixing chamber 2.

According to one feature, the mixing chamber 2 is configured so as to comprise a rectilinear pipe 6. In the illustrated example, this pipe 6 is arranged between a wall of an inner part 7 and an inner surface of another part, for example a wall 16, here belonging to the outer jacket of the mixer 1 and more particularly to the cover 15, 16, removed in FIG. 1. This pipe 6 is rectilinear with axis A. The sprayer 3 is positioned in the upstream part, relative to the circulation direction of the exhaust gas, of the rectilinear pipe 6. The sprayer is oriented such that its spray jet is directed in the downstream direction, substantially parallel to the axis A of the rectilinear pipe 6. Thus, the spray jet is aligned with the axis A, which is a direction that has a significant free distance, without obstacles. This significantly reduces the risks of any encounter between the spray jet and a wall of the mixer 2 facing it. Furthermore, the exhaust gas accompanies and surrounds the spray jet along the rectilinear pipe 6, performing guiding further contributing to reducing the risks of any encounter between the spray jet and a wall of the mixer 2, lateral with respect to the rectilinear pipe 6. At the downstream end of the pipe 6, the reducing agent is completely mixed with the exhaust gas. Therefore, the reducing agent no longer risks becoming deposited against the wall in the following turn.

In order to improve the desired effect, the pipe 6 is as long as possible. Thus, based on the shape constraints of the mixer 1, the arrangement of the pipe 6 in the mixing chamber 2 is such that it maximizes the length of the pipe 6. This can, for example, be done by using the largest dimension of the mixer 2. According to another feature, at least one after-treatment component, commonly called monolith 17, 18, is positioned downstream of the mixer 1. Such a monolith 17, 18 is typically a catalyst treating the mixture produced by the mixer 1. Such a monolith 17, 18 has a substantially cylindrical shape and is positioned, at the outlet 5, perpendicular to the axis A. Therefore, the diameter and the number of the monolith(s) 17, 18 dimensions the mixer 1 and constrains the length of the rectilinear pipe 6. The length of the rectilinear pipe 6 can then be inclusively between the diameter of a monolith 17, 18 and the sum of the diameters of said at least one monolith 17, 18 increased by 50%. Thus for example, for two monoliths 17, 18 with diameter 266 mm, the length of the rectilinear pipe 6 can be 600 mm.

According to another feature, the mixer 1 also comprises a deflector 7. This deflector 7, which is substantially U-shaped, makes it possible, with the outer jacket 14, 15, 16 of the mixer 1, to form the rectilinear pipe 6. Indeed, the inlet 4 is positioned outside the "U", more specifically outside a first branch 11 of the "U". The outlet 5 is positioned at the bottom of the "U". Gas circulation is thus formed in three successive parts 8-10. In a first part 8, the gas, whether it involves the exhaust gas alone or mixed with the reducing agent, circulates from the inlet 4 to the base 13 of the "U". To that end, it runs alongside a first branch 11 of the "U" from the outside. In a second part 9, the gas circulates from the base 13 of the "U" to the end of a second branch 12 of the "U". To that end, it runs alongside a second branch 12 of the "U", still from the outside. This second part 9 forms the rectilinear pipe 6. This second part 9 is surrounded by the outer surface of the second branch 12 of the "U" on the left and by an inner surface of the mixing chamber 2 on the right, these two surfaces being substantially parallel and substantially rectilinear. Lastly, after having bypassed the end of the second branch 12 of the "U", the gas circulates in a third part 10 from the end of the second branch 12 of the "U" to the outlet 5. To that end, it enters the "U" and runs alongside the branches 11, 12 of the "U" from the inside, to the outlet 5, positioned at the bottom of the "U".

The "U" makes it possible to orient the gas circulation in a spiral, here convergent, from an outer inlet 4 toward an inner outlet 5. It is alternatively possible to reverse by producing a divergent spiral, for example by reversing inlet 4 and outlet 5. Here, the spiral rotates counterclockwise. It could also rotate clockwise.

According to another feature (not shown), the deflector 7 is further extended, so as to form a scroll, continuing the spiral. To this end, the deflector 7 further comprises a third branch, connected to the end of the first branch 11 and running alongside the rectilinear pipe 6 by the outside to the sprayer 3. Relative to the illustrated embodiment, where the pipe 6 is bordered by the flank 16 belonging to the cover, producing a third branch integrated into the deflector 7 makes it possible to obtain better tightness.

According to another feature (not shown), the deflector 7 also comprises an upper cover connecting all of its branches 11, 12, or the first branch 11, the second branch 12 and the optional third branch. Relative to the illustrated embodiment, where the three parts 8-10 are closed by the upper face 15 belonging to the cover, producing a cover integrated with the deflector 7 makes it possible to obtain better tightness.

Figure 2:
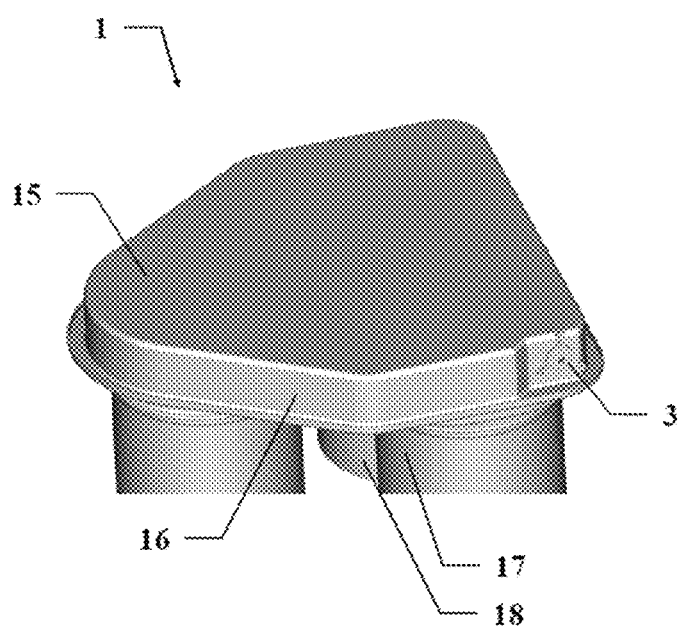
FIG. 2 shows the embodiment of FIG. 1, cover in place, in perspective view.

According to another feature, more particularly visible in FIGS. 1-2, the mixing chamber 2 is in the form of a box. This box comprises two faces 14, 15 that are substantially planar and substantially parallel to one another. The first face 14 is the bottom of the box. The second face 15 is borne by the cover 15, 16, removed in FIG. 1. A peripheral flank 16, configured along a closed contour and extending from one face 14, 15 to the other, completes the box. The flank 16 is substantially perpendicular to both faces 14, 15. Here, the flank 16 is also borne by the cover 15, 16. The deflector 7, like the flank 16, is substantially perpendicular to both faces 14, 15 and extends from one face 14, 15 to the other. The first branch 11 of the deflector 7 extends so as to come into contact with the inside of the flank 16, so as to prevent the gas from bypassing the end of the first branch 11.

The sprayer 3 is positioned upstream of the rectilinear pipe 6, advantageously in the flank 16.

Due to its outside positioning, the inlet 4 can be positioned substantially at any point of the mixer 1. Therefore, according to another feature, the inlet 4 is positioned in the peripheral flank 16 or in one of the faces 14, 15.

Due to its inside positioning, the outlet 5 must occupy a more central position, relative to the spiral. Therefore, according to another feature, the outlet 5 is positioned in one of the faces 14, 15.

It is advantageous, in order to facilitate the integration of the mixer 1, to be able to position it at a turnaround point or to change directions of the circulation. Therefore, according to another feature, the inlet 4 and the outlet 5 are positioned in a same face. This also makes it possible to simplify the bottom 14 or, as illustrated, the upper face 15 and the cover by not positioning the inlet 4 or the outlet 5 there.

The disclosure further relates to an exhaust line comprising such a mixer 1.

The disclosure also relates to a vehicle comprising such an exhaust line.

The disclosure has been illustrated and described in detail in the drawings and the preceding description. The latter must be considered to be illustrative and provided as an example, and not as limiting the disclosure to this description alone. Many variant embodiments are possible.

LIST OF REFERENCE SIGNS

1: mixer,
2: mixing chamber,
3: sprayer,
4: inlet,

5: outlet,
6: pipe,
7: deflector,
8: 1st part,
9: 2nd part,
10: 3rd part,
11: 1st branch,
12: 2nd branch,
13: base,
14: 1st face,
15: 2nd face,
16: flank,
17, 18: monolith,
A: axis of the pipe and spraying axis.

The invention claimed is:

1. An after-treatment exhaust gas mixer for mixing the exhaust gas with a reducing agent, such as a diesel exhaust fluid for selective catalyst reduction, comprising:
 a mixing chamber through which the exhaust gas circulates, from an inlet to an outlet;
 a reducing agent sprayer, able to spray the reducing agent into the mixing chamber, wherein the mixing chamber comprises a rectilinear pipe that is rectilinear along an axis and the reducing agent sprayer is positioned in an upstream part of the rectilinear pipe and oriented to spray in a downstream direction parallel to the axis; and
 wherein the after-treatment exhaust gas mixer is configured to be positioned upstream of at least one cylindrical monolith positioned perpendicularly to the axis and where a length of the rectilinear pipe is inclusively between a diameter of one of the at least one cylindrical monolith and a sum of the diameters of said at least one cylindrical monolith increased by 50%.

2. An after-treatment exhaust gas mixer for mixing the exhaust gas with a reducing agent, such as a diesel exhaust fluid for selective catalyst reduction, comprising:
 a mixing chamber through which the exhaust gas circulates, from an inlet to an outlet; a reducing agent sprayer, able to spray the reducing agent into the mixing chamber, wherein the mixing chamber comprises a rectilinear pipe that is rectilinear along an axis and the reducing agent sprayer is positioned in an upstream part of the rectilinear pipe and oriented to spray in a downstream direction parallel to the axis; and
 further comprising a U-shaped deflector, having a first branch, a second branch, and a base, the inlet being positioned outside of the first branch of the U-shaped deflector and the outlet being positioned at a bottom of the U-shaped deflector, so as to form a circulation of gas in three successive parts: a first part running alongside the first branch of the U-shaped deflector on the outside and connecting the inlet with the base of the U-shaped deflector, a second part, forming the rectilinear pipe, running alongside the second branch of the U-shaped deflector on the outside and connecting the base of the U-shaped deflector with an end of the second branch of the U-shaped deflector, and a third part running alongside the first branch and the second branch of the U-shaped deflector on the inside and connecting the end of the second branch of the U-shaped deflector with the outlet.

3. The after-treatment exhaust gas mixer according to claim 2, where the U-shaped deflector further comprises a third branch, connected to an end of the first branch and running alongside the rectilinear pipe to the reducing agent sprayer.

4. The after-treatment exhaust gas mixer according to claim 2, where the U-shaped deflector also comprises an upper cover connecting all branches.

5. The after-treatment exhaust gas mixer according to claim 2, where the mixing chamber is configured as a box, comprising two planar faces that are parallel to one another, and a peripheral flank having a closed contour and extending from one planar face to the other planar face, the U-shaped deflector extending from one planar face to the other planar face and having the first branch extended to an inside of the peripheral flank.

6. The after-treatment exhaust gas mixer according to claim 5, where the inlet is positioned in the peripheral flank.

7. The after-treatment exhaust gas mixer according to claim 5, where the inlet is positioned in one of the two planar faces.

8. The after-treatment exhaust gas mixer according to claim 5, where the outlet is positioned in one of the two planar faces.

9. The after-treatment exhaust gas mixer according to claim 5, where the inlet and the outlet are positioned in a same planar face of the two planar faces.

10. An exhaust line comprising the after-treatment exhaust gas mixer according to claim 2.

11. A vehicle comprising the exhaust line according to claim 10.

* * * * *